United States Patent [19]
Friederich et al.

[11] Patent Number: 6,009,911
[45] Date of Patent: Jan. 4, 2000

[54] SAFETY HOSE

[75] Inventors: Hans-Werner Friederich, Winsen; Winfried Hellmig, Buxtehude; Uwe Maass; Peter Zerfowski, both of Hamburg, all of Germany

[73] Assignee: Phoenix Aktiengesellschaft, Hamburg, Germany

[21] Appl. No.: 09/011,391

[22] PCT Filed: Sep. 2, 1996

[86] PCT No.: PCT/DE96/01621

§ 371 Date: Feb. 6, 1998

§ 102(e) Date: Feb. 6, 1998

[87] PCT Pub. No.: WO97/09558

PCT Pub. Date: Mar. 13, 1997

[30] Foreign Application Priority Data

Sep. 5, 1995 [DE] Germany ............... 195 32 647

[51] Int. Cl.[7] ................................................. F16L 11/12
[52] U.S. Cl. .................... 138/137; 138/141; 138/104; 138/DIG. 1
[58] Field of Search ........................ 138/36, 104, 137, 138/141, DIG. 1

[56] References Cited

U.S. PATENT DOCUMENTS

| | | |
|---|---|---|
| 3,604,461 | 9/1971 | Matthews . |
| 3,893,488 | 7/1975 | Rogers et al. ............. 138/141 |
| 4,643,927 | 2/1987 | Luecke et al. ............. 138/137 |
| 5,474,822 | 12/1995 | Rober et al. ............. 138/137 |
| 5,699,835 | 12/1997 | Nakagawa et al. ......... 138/141 |
| 5,706,865 | 1/1998 | Douchet ................. 138/137 |

FOREIGN PATENT DOCUMENTS

| | | |
|---|---|---|
| 567115 | 4/1993 | European Pat. Off. . |
| 2552819 | 5/1977 | Germany . |
| 4438840 | 5/1995 | Germany . |
| 4416953 | 6/1995 | Germany . |
| 1171933 | 11/1969 | United Kingdom . |
| WO86/07432 | 12/1986 | WIPO . |

Primary Examiner—James F. Hook
Attorney, Agent, or Firm—Collard &Roe, P.C.

[57] ABSTRACT

The invention concerns a safety hose made of elastomer material and/or plastics, in particular for conveying environmentally-harmful substances and comprising: an inner layer; an outer layer; and an embedded rigid carrier in turn comprising two rigid carrier systems, each of which comprises one or a plurality of layers. Disposed between the two rigid carrier systems is at least one separating intermediate layer, the rigid carrier system facing the inner layer having a low extensibility and high chemical resistance to the substance to be conveyed, whilst the rigid carrier system facing the outer layer has a high extensibility. As a possible variant, an adhesion system can be provided between the rigid carrier system and the outer layer. The adhesion system comprises a radial, helical or axial two-zone system, the one zone having a lesser adhesion effect than the other zone.

20 Claims, 3 Drawing Sheets

SAFETY HOSE

DESCRIPTION

The invention relates to a safety hose made of elastomeric material and/or plastic, in particular for conveying environmentally harmful substances (e.g. chemicals), comprising an inner layer (1) (core), an outer layer (cover), as well as an embedded rigid carrier in turn comprising two rigid carrier systems, each of which comprises one or a plurality of layers, whereby at least one separating intermediate layer is disposed between the two rigid carrier systems, and whereby the rigid carrier system—in the following referred to as rigid carrier system (I)—facing the inner layer has low extensibility, in particular an elongation at break of <10% as well as high chemical resistance versus the substance to be conveyed, whereas the rigid carrier system—in the following referred to as rigid carrier system (II)—facing the outer layer has high extensibility, in particular an elongation at break of >10%.

A safety hose of this type is known, for example from EP-A-0 567 115, DF-C-44 16 953 and DE-A-44 38 840. The outer layer of the safety hose according to DE-C-44 16 953, with a rigid carrier system (II) with higher chemical resistance as compared to rigid carrier system (I), is perforated, so that the substance can escape to the outside in case of failure of the hose. In the event of breakdown of the hose which is not noticed immediately, this constitutes the greatest hazard for the user under certain circumstances. If caustic, toxic or explosive substances should exit from such a hose system, this may lead to damage of equipment or injury to persons.

According to the current state of the art it is very difficult, furthermore, to develop for the wide spectrum of substances a safety system that is suitable for all substance classifications. For example, a hose has been developed earlier which is capable of indicating a defect before substance can exit from the hose, by equipping rigid carrier system (I) with a conductive material. Should said rigid carrier system get destroyed, the electrical conductor becomes defective as well, so that the interruption of the conductor can be indicated (EP-A-0 567 115; DE-A-44 38 840). However, it is not advisable to operate with such systems in connection with all substances.

Now, against the state of the art outlined above the problem of the invention is to make available a safety hose which, in the event of any failure of the basic body, is substance-tight until the hose is replaced.

According to the invention, said problem is solved by a safety hose with the characterizing features of claim 1 or 2.

According to the one variation, an adhesion system—in the following referred to as adhesion system (III)—is present between rigid carrier system (II) and the outer layer. Said adhesion system is provided with a radially, helically or axially extending two-zone system (A, B), whereby the one zone—in the following referred to as zone (A)—is characterized by a lesser adhesion effect as compared to the other zone—in the following referred to as zone (B)—, whereby in particular the following alternatives are employed with respect to adhesion system (III):

Adhesion system (III) is joined with the outer layer in the form of one piece (i.e., material-locked), whereby the different adhesion effect develops within the two-zone system (A, B) particularly directly (i.e., without an additional layer) on rigid carrier system (II).

However, for reasons of production engineering, it is more advantageous if adhesion system (III) forms its own adhesive layer, whereby the different adhesion effect develops within the two-zone system (A, B) exclusively on the side facing rigid carrier system (II), in particular again directly on the rigid carrier system.

According to the other variation, an adhesion system—in the following referred to as adhesion system (IV)—is present between rigid carrier system (II) and the intermediate layer. Said adhesion system is provided with a radially helically or axially extending two-zone system (A, B) as well, which is characterized by the differences in adhesion specified above, whereby in particular the following alternatives are applied with respect to adhesion system (IV);

Adhesion system (IV) is joinecd with the intermediate layer in the form of one piece, whereby the different adhesive effect develops within the two-zone system (A, B) directly on rigid carrier system (II) or preferably on an additional layer disposed between adhesion system (IV) and rigid carrier system (II). Here, the additional layer advantageously has a lesser thickness than the actual intermediate layer.

For production engineering reasons is is more advantageous in this case as well if adhesion system (IV) forms its own adhesive layer, whereby the different adhesion effect develops within the two-zone system (A, B) exclusively on the side facing the rigid carrier system, specifically directly on rigid carrier system (II) or on an additional layer as specified above in detail.

Usefully, the following design possibilities are applicable with respect to adhesion system (III, IV) with two-zone system (A, B) as defined by the invention, irrespective of the variations or alternatives introduced above:

The adhesive effect is substantially constant within each zone (A, B) itself.

The adhesion system (III, IV) substantially extends across the entire length of the hose.

Zone (A) with the lesser adhesion effect has an adhesion value of <1N/mm, particularly $\leq 0.5\%$, whereas zone (B) with the greater adhesion effect has an adhesion value of >1N/mm, particularly $\geq 2$N/mm.

Zone (B) with the greater adhesion effect has a width "b", which is smaller than width "a" of zone (A) with the lesser adhesion effect, whereby particularly the following width parameters apply:

"b"=(10 to 30%) of "a"

With a radially or helically extending two-zone system (A, B), width "a" of zone (A) with the lesser adhesion effect has 1 to 3 times the outside diameter of the hose.

With an axially extending two-zone system (A, B), at least three zones (A) are present, distributed over the circumference of the hose.

Particularly with a radially extending two-zone system (A, B), at least one axially extending channel is arranged within zone (B) with the greater adhesion effect, whereby width "c" of the channel preferably amounts to at least 5 mm based on the top view.

The intermediate layer and the additional layer according to claim 5 consist of a thermoplastic elastomer.

Furthermore, it is advantageous if a siffening spiral made of plastic or metallic material is arranged within the area between the two rigid carrier systems (I, II), such spiral being characterized by high chemical resistance versus the substance to be conveyed, whereby the spiral extends preferably within the immediate proximity of one of the two rigid carrier systems (I, II).

The rigid carrier systems (I) and/or (II) are usefully equipped with an electrically conductive system, whereby particularly the following parameters are applicable:

Rigid carrier system (II) having an elongation at break of >10% contains an electrically conductive system having an elongation at break of <10%.

Rigid carrier system (I) having an elongation at break of <10% has an electrically conductive system having an elongation at break not greater than the one of rigid carrier system (I).

In this connection, the electrically conductive system is advantageously connected to a warning system, which is arranged particularly within the area of the end of the hose.

The invention is explained on exemplified embodiments by reference to schematic drawings, in which.

Figure 1:
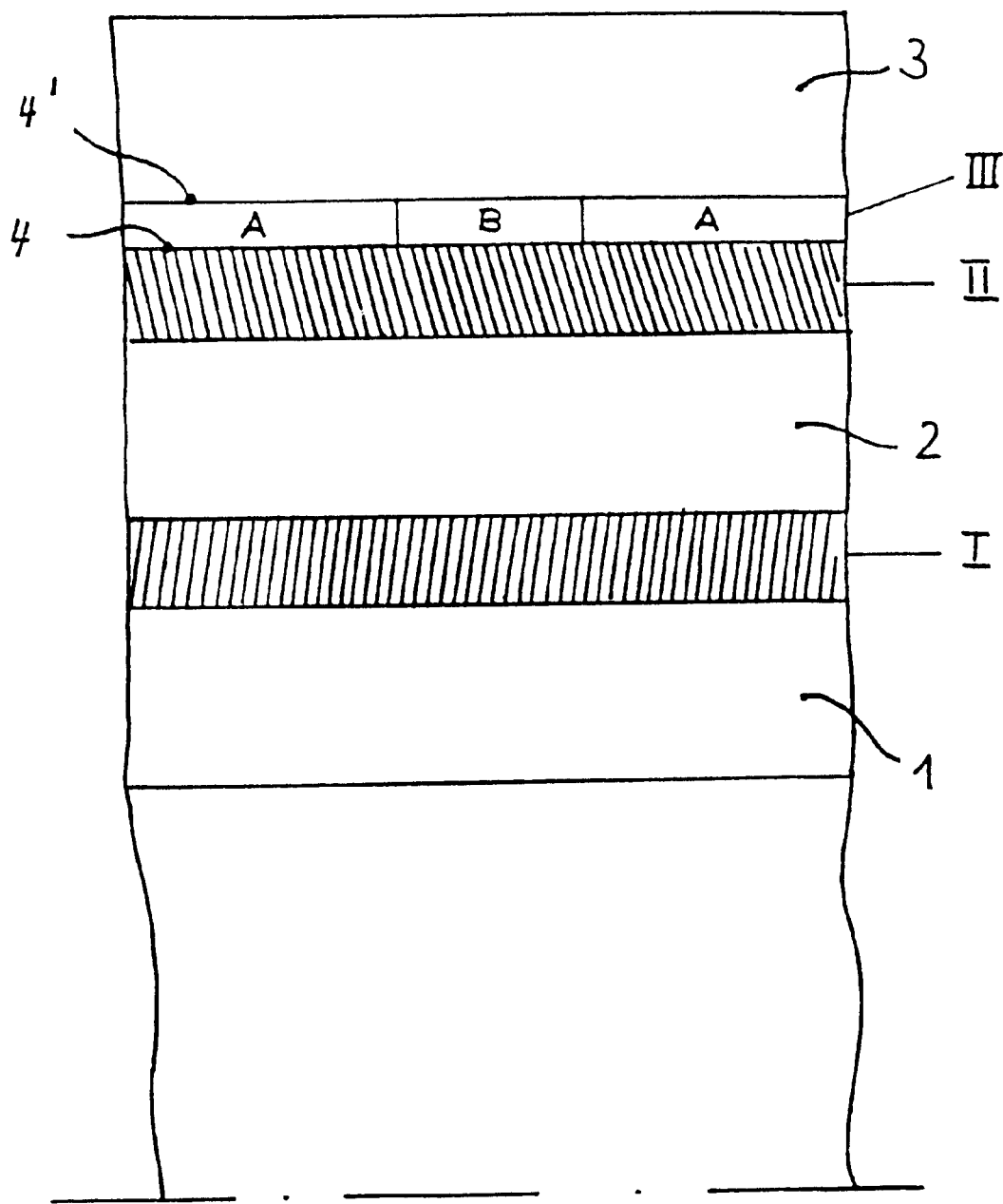
FIG. 1 is a longitudinal section through a safety hose, in which the radially extending two-zone system (A, B) of adhesion system (III) is arranged between rigid carrier system (II) and the outer layer.
Figure 2:
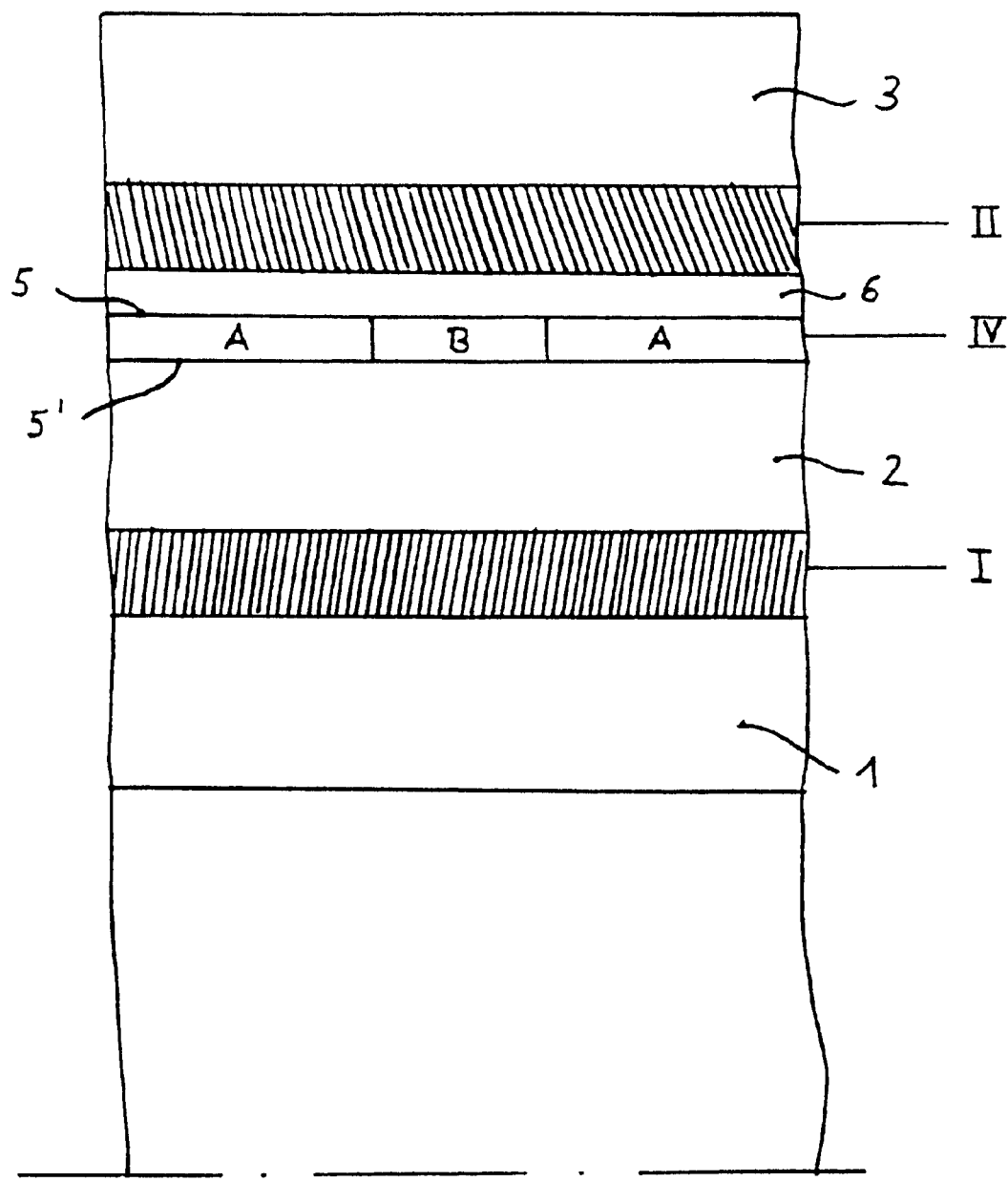
FIG. 2 is a longitudinal section through a safety hose in which the radially extending two-zone system (A, B) of adhesion system (IV) is arranged between rigid carrier system (II) and the intermediate layer, namely with the use of an additional layer.

FIGS. 1 and 2 show two hose constructions both having the following basic structure:
1 Inside layer (core);
2 Intermediate layer;
3 Outer layer (cover);
I Rigid carrier system with low elongation as well as high chemical resistance versus the substance to be conveyed;
II Rigid carrier system with high elongation.

Now, according to FIG. 1, an adhesion system (III) is disposed between rigid carrier system (II) and outer layer (3), said adhesion system being provided with a radially extending two-zone system (A, B), whereby zone (A) is characterized by a lesser adhesion effect as compared to zone (B). In this connection, adhesion system (III) forms its own adhesive layer, whereby the different adhesion effect acts within the two-zone system (A, B) exclusively on the side (4) facing rigid carrier system (II), specifically directly on the rigid carrier system. The usual constant adhesion conditions apply with respect to side (4') of adhesion system (III) facing outer layer (3).

According to FIG. 2, the safety hose is equipped with an adhesion system (IV) disposed between rigid carrier system (II) and intermediate layer (2) and provided with a radially extending two-zone system (A, B) as well, whereby zone (A) is characterized by a lesser adhesive effect as compared to zone (B). Here, an additional layer (6) is arranged between adhesion system (IV) and rigid carrier system (II), said additional layer having a lesser thickness than the acual intermediate layer (2). In this case too, adhesion system (IV) is designed in such a way that it forms its own adhesive layer, whereby the different adhesion effect within two-zone system (A, B) exclusively develops on the side (5) facing rigid carrier system (II), specifically on additional layer (6) in the present case. The usual constant conditions of adhesion apply again on side (5') of adhesion system (IV) facing the intermediate layer (2).

Figure 3:
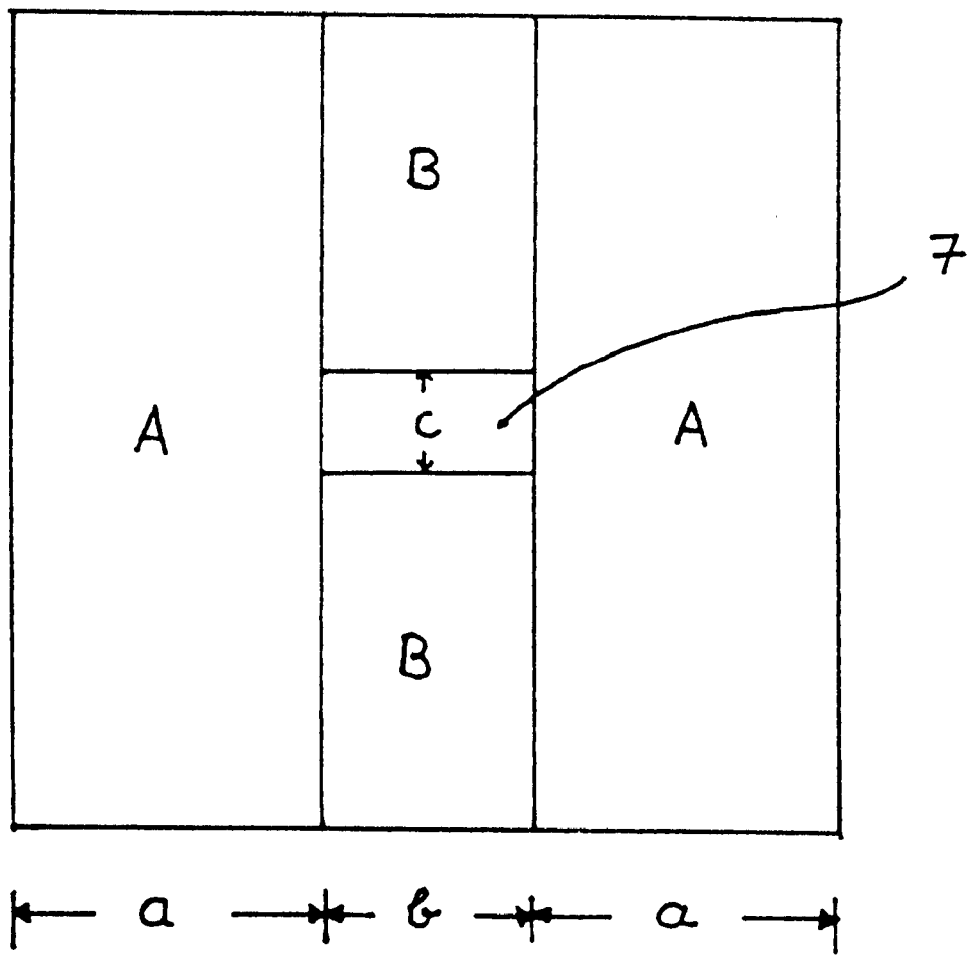
FIG. 3 is a top view of the radially extending two-zone system (A, B), in connection with which an axially extending channel is arranged within zone (B).

Now, FIG. 3 shows the radially extending two-zone system (A, B) with width "a" for zone (A) and with width "b" for zone (B), whereby a channel (7) with width "c" extends within zone (B) in the axial direction.

Said exemplified embodiments illustrate that in the event of failure of the basic body, i.e., the inner layer (1) of rigid carrier system (I) and intermediate layer (3), an emergency operation property is formed without substance leaking out. For example, in connection with the hose design according to FIG. 1, outer layer (3) is detached within the area of zone (A) with formation of a bubble, whereby such bubble is capable of receiving the diffusing substance. With a helical or axial arrangement of two-zone system (A, B), the substance is then transported, furthermore, helically or axially in the direction of the hose.

With a radial arrangement of two-zone system (A, B), it is then advantageous if zone (B) has at least one channel (7) extending in the axial direction in accordance with FIG. 3, whereby width "c" of the channel should then amount to at least 5 mm.

What is claimed is:

1. A safety hose made of elastomeric material and/or plastic, in particular for conveying environmentally harmful substances, comprising an inner layer (1);

an outer layer (3), as well as an embedded rigid carrier in turn comprising two rigid carrier systems (I, II) each comprising one or a plurality of layers, whereby at least one separating intermediate layer (2) is present between the two rigid carrier systems, and whereby the rigid carrier system (I) facing the inner layer (1) has a lesser elongation as well as high chemical resistance versus the substance to be conveyed, whereas the rigid carrier system (II) facing the outer layer (3) has high elongation, characterized in that an adhesion system (III) is present between the rigid carrier system (II) and the outer layer (3), said adhesion system being provided with a radially, helically or axially extending two-zone system (A, B), whereby zone (A) is characterized by a lesser adhesion effect as compared to the other zone (B).

2. The safety hose according to claim 1, characterized in that adhesion system (III)

is joined with outer layer (3) in the form of one piece, whereby the different adhesion effect develops within two-zone system (A, B) in particular directly on rigid carrier system (II); or preferably forms its own adhesive layer, whereby the different adhesion effect develops within two-zone system (A, B) exclusively on side (4) facing rigid carrier system (II), in particular directly on the rigid carrier system.

3. The safety hose according to claim 1, characterized in that the adhesive effect is substantially constant within each zone (A, B).

4. The safeyy hose according to claim 1, characterized in that the adhesion system (III, IV) with the two-zone system (A, B) substantially extends across the entire length of the hose.

5. The safety hose according to claim 1, characterized in that with a radially or helically extending two-zone system (A, B), width "a" of zone (A) with the lesser adhesive effect amounts to 1 to 3 times the outside diameter of the hose.

6. The safety hose according to claim 1, characterized in that with an axially extending two-zone system (A, B), at least three zones (A) are present, distributed over the circumference of the hose.

7. The safety nose according to claim 1, characterized in that particularly with a radially extending two-zone system (A, B), at least one axially extending channel (7) is arranged within the zone (B) with the greater adhesive effect, whereby width "c" of the channel preferably amounts to at least 5 mm based on the top view.

8. The safety hose according to claim 1, characterized in that a stiffening spiral made of plastic or metallic material is arranged within the area between the two rigid carrier systems (I, II), said spiral being characterized by high chemical resistance to the substance to be conveyed, whereby the spiral preferably extends within the immediate proximity of one of the two rigid carrier systems (I, II).

9. The safety hose according to claim 1, characterized in that the rigid carrier system (I) with an elongation at break of <10% facing the inner layer (1) contains an electrically conductive system having an elongation at break not greater than the one of rigid carrier system (I).

10. The safety hose according to claim 1 wherein the zone (A) with the lesser adhesive effect has an adhesion value of <1N/mm, whereas the zone (B) with the greater adhesive effect has an adhesion value of >1N/mm.

11. The safety hose according to claim 10 wherein the zone (A) with the lesser adhesive effect has an adhesion value of $\leq 0.5$N/mm.

12. The safety hose according to claim 10 wherein the zone (B) with the greater adhesive effect has an adhesion value of $\geq 2$N/mm.

13. The safety hose according to claim 1 wherein the zone (B) with the greater adhesive effect has a width "b" smaller than a width "a" of the zone (A) with the lesser adhesive effect.

14. The safety hose according to claim 13 wherein the zone (B) with the greater adhesive effect has a width "b" and the zone (A) with the lesser adhesive effect has a width "a" and "b"=(10 to 30%) of "a".

15. The safety hose according to claim 1, characterized in that the rigid carrier system (II) facing the outer layer (3) with an elongation at break of >10% contains an electrically conductive system having an elongation at break of <10%.

16. The safety hose according to claim 15, characterized in that the electrically conductive system is connected to a warning system particularly arranged within the area of the end of the hose.

17. A safety hose made of elastomatic material and/or plastic, in particular for conveying environmentally harmful substances, comprising an inner layer (1);

an outer layer (3); as well as an embedded rigid carrier in turn comprising two rigid carrier systems (I, II) each comprising one or a plurality of layers, whereby at least one separating intermediate layer (2) is present between the two rigid carrier systems and whereby the rigid carrier system (I) facing the inner layer (1) has low elongation as well as high chemical resistance versus the substance to be conveyed, whereas the rigid carrier system (II) facing the outer layer (3) has high elongation, characterized in that an adhesion system (IV) is present between rigid carrier system (I) and an intermediate layer (2), said adhesion system being provided with a radially, helically or axially extending two-zone system (A, B) whereby the one zone (A) is characterized by a lesser adhesion effect as compared to the other zone (B).

18. The safety hose according to claim 17, characterized in that the adhesion system (IV)

is joined with intermediate layer (2) in the form of one piece, or preferably forms its own adhesive layer, whereby the different adhesion effect develops within the two-zone system (A, B) exclusively on side (5) facing rigid carrier system (II).

19. The safety hose according to claim 18, characterized in that with adhesion system (IV), the different adhesion effect develops within the two-zone system (A, B)

directly on rigid carrier system (II) or preferably on an additional layer (6) disposed between adhesion system (IV) and rigid carrier system (II), whereby the additional layer (6) preferably has a lesser thickness than the actual intermediate layer (2).

20. The safety hose according to claim 1, characterized in that the intermediate layer (2) and the additional layer (6) are made of a thermoplastic elastomer.

* * * * *

UNITED STATES PATENT AND TRADEMARK OFFICE
CERTIFICATE OF CORRECTION

PATENT NO. : 6,009,911
DATED : January 4, 2000
INVENTOR(S) : Friederich et al.

Page 1 of 1

It is certified that error appears in the above-identified patent and that said Letters Patent is hereby corrected as shown below:

<u>Column 6,</u>
Line 37, change "claim 1" to -- claim 19 --.

Signed and Sealed this

Fourteenth Day of August, 2001

*Attest:*

Nicholas P. Godici

*Attesting Officer*

NICHOLAS P. GODICI
*Acting Director of the United States Patent and Trademark Office*